US008779898B2

(12) United States Patent
Havens et al.

(10) Patent No.: US 8,779,898 B2
(45) Date of Patent: Jul. 15, 2014

(54) ENCODED INFORMATION READING TERMINAL WITH MICRO-ELECTROMECHANICAL RADIO FREQUENCY FRONT END

(75) Inventors: William H. Havens, Syracuse, NY (US); Huyu Qu, San Jose, CA (US)

(73) Assignee: Hand Held Products, Inc., Fort Mill, SC (US)

(*) Notice: Subject to any disclaimer, the term of this patent is extended or adjusted under 35 U.S.C. 154(b) by 400 days.

(21) Appl. No.: 13/211,555

(22) Filed: Aug. 17, 2011

(65) Prior Publication Data

US 2013/0043980 A1    Feb. 21, 2013

(51) Int. Cl.
*G08B 13/14* (2006.01)
*H04Q 3/00* (2006.01)
*H04Q 5/22* (2006.01)
*G06F 7/40* (2006.01)
*H04B 1/16* (2006.01)

(52) U.S. Cl.
USPC .............. 340/10.1; 340/539.22; 340/568.1; 340/572.1; 235/426; 235/439; 455/200.1; 455/234.2

(58) Field of Classification Search
USPC ............... 340/10.1, 572.1, 539.1; 235/426
See application file for complete search history.

(56) References Cited

U.S. PATENT DOCUMENTS

| 5,579,341 | A | 11/1996 | Smith et al. |
| 5,812,605 | A | 9/1998 | Smith et al. |
| 5,903,825 | A | 5/1999 | Goode et al. |
| 6,167,099 | A | 12/2000 | Rader et al. |
| 6,751,470 | B1 | 6/2004 | Ella et al. |

(Continued)

FOREIGN PATENT DOCUMENTS

| EP | 2061285 A2 | 5/2009 |
| WO | WO-9814023 A1 | 4/1998 |

OTHER PUBLICATIONS

C.T.-C Nguyen, "Vibrating RF MEMS for Low Power Communications (invited)," Proceedings, 2002 MRS Fall Meeting, Boston, Massachusetts, Dec. 2-6, 2002, pp. J12.1.1-J2.1.12 (12 pages).

(Continued)

*Primary Examiner* — Fekadeselassie Girma
(74) *Attorney, Agent, or Firm* — Additon, Higgins, Pendleton & Ashe, P.A.

(57) ABSTRACT

An encoded information reading (EIR) terminal can comprise a microprocessor electrically coupled to a system/data bus, a memory communicatively coupled to the microprocessor, an EIR device, a multi-band antenna, and a wireless communication interface. The EIR device can be provided by a bar code reading device, an RFID reading device, or a card reading device. The EIR device can be configured to output raw message data containing an encoded message and/or output decoded message data corresponding to an encoded message. The wireless communication interface can comprise a radio frequency (RF) front end electrically coupled to the multi-band antenna. The RF front end can comprise a micro-electromechanical (MEMS) filter array including one or more band-pass filter. Each band-pass filter of the MEMS filter array can be electrically coupled to a bias voltage source or an oscillating signal source. The RF front end can be electrically coupled to an analog-to-digital (A/D) converter and/or to a digital-to-analog (D/A) converter. The wireless communication interface can be configured to transmit radio signals in two or more frequency regulatory domains and/or receive radio signals in two or more frequency regulatory domains. The multi-band antenna can in one embodiment be provided by a meta-material antenna.

20 Claims, 14 Drawing Sheets

(56) References Cited

U.S. PATENT DOCUMENTS

| | | |
|---|---|---|
| 6,911,945 B2 | 6/2005 | Korva |
| 6,937,196 B2 | 8/2005 | Korva |
| 6,960,984 B1* | 11/2005 | Vicci et al. .................. 340/10.1 |
| 6,961,544 B1 | 11/2005 | Hagstrom |
| 7,072,690 B2 | 7/2006 | Shin et al. |
| 7,161,357 B2 | 1/2007 | Lee et al. |
| 7,190,728 B2 | 3/2007 | Kawada et al. |
| 7,202,776 B2 | 4/2007 | Breed |
| 7,202,819 B2 | 4/2007 | Hatch |
| 7,218,678 B2 | 5/2007 | Katta et al. |
| 7,251,499 B2 | 7/2007 | Ella et al. |
| 7,265,731 B2 | 9/2007 | Vance et al. |
| 7,283,094 B2 | 10/2007 | Lee |
| 7,307,331 B2 | 12/2007 | Kipnis et al. |
| 7,333,067 B2 | 2/2008 | Hung et al. |
| 7,368,311 B2 | 5/2008 | Tilmans et al. |
| 7,423,599 B2 | 9/2008 | Li et al. |
| 7,446,717 B2 | 11/2008 | Hung et al. |
| 7,466,274 B2 | 12/2008 | Lin et al. |
| 7,525,474 B2* | 4/2009 | Carocari et al. ............... 342/47 |
| 7,586,387 B2 | 9/2009 | Van Delden |
| 7,592,957 B2 | 9/2009 | Achour et al. |
| 7,617,342 B2 | 11/2009 | Rofougaran |
| 7,696,929 B2 | 4/2010 | Kaneda |
| 7,741,965 B2 | 6/2010 | Lai et al. |
| 7,750,435 B2 | 7/2010 | Rofougaran et al. |
| 7,764,232 B2 | 7/2010 | Achour et al. |
| 7,795,700 B2 | 9/2010 | Rofougaran et al. |
| 7,809,329 B2 | 10/2010 | Rofougaran et al. |
| 7,835,157 B2 | 11/2010 | Tilmans et al. |
| 7,839,216 B2 | 11/2010 | Alidio et al. |
| 7,839,236 B2 | 11/2010 | Dupuy et al. |
| 7,847,739 B2 | 12/2010 | Achour et al. |
| 7,855,696 B2 | 12/2010 | Gummalla et al. |
| 7,874,483 B2 | 1/2011 | Wang et al. |
| 7,885,600 B2 | 2/2011 | Rofougaran et al. |
| 7,893,790 B2 | 2/2011 | Van Delden |
| 7,899,394 B2 | 3/2011 | Rofougaran et al. |
| 7,903,724 B2 | 3/2011 | Rofougaran et al. |
| 7,908,420 B2 | 3/2011 | Rofougaran et al. |
| 2002/0055368 A1 | 5/2002 | Lee |
| 2002/0183013 A1 | 12/2002 | Auckland et al. |
| 2004/0249915 A1 | 12/2004 | Russell |
| 2005/0128152 A1 | 6/2005 | Milosavljevic |
| 2005/0156796 A1 | 7/2005 | Nysen |
| 2005/0271133 A1 | 12/2005 | Waxman |
| 2006/0025102 A1 | 2/2006 | Kipnis et al. |
| 2006/0070089 A1 | 3/2006 | Shoaib et al. |
| 2006/0128332 A1 | 6/2006 | van Rooyen et al. |
| 2006/0135084 A1 | 6/2006 | Lee |
| 2006/0261821 A1 | 11/2006 | Lee et al. |
| 2006/0261938 A1 | 11/2006 | Lai et al. |
| 2006/0279446 A1 | 12/2006 | Wang et al. |
| 2007/0060089 A1 | 3/2007 | Owen et al. |
| 2007/0257847 A1 | 11/2007 | Su et al. |
| 2008/0042847 A1 | 2/2008 | Hollister et al. |
| 2008/0048917 A1 | 2/2008 | Achour et al. |
| 2008/0076383 A1 | 3/2008 | Barrett et al. |
| 2008/0079579 A1* | 4/2008 | Posamentier ............. 340/572.1 |
| 2008/0107213 A1 | 5/2008 | Gupta et al. |
| 2008/0150807 A1 | 6/2008 | Lin et al. |
| 2008/0150829 A1 | 6/2008 | Lin et al. |
| 2008/0157897 A1 | 7/2008 | Tilmans et al. |
| 2008/0181186 A1 | 7/2008 | Rofougaran et al. |
| 2008/0181287 A1 | 7/2008 | Rofougaran et al. |
| 2008/0182613 A1 | 7/2008 | Rofougaran et al. |
| 2008/0237341 A1 | 10/2008 | Fleck et al. |
| 2008/0258981 A1 | 10/2008 | Achour et al. |
| 2008/0258993 A1 | 10/2008 | Gummalla et al. |
| 2008/0278370 A1 | 11/2008 | Lachner et al. |
| 2008/0297404 A1 | 12/2008 | Lin et al. |
| 2009/0006677 A1 | 1/2009 | Rofougaran et al. |
| 2009/0023408 A1* | 1/2009 | Someya ..................... 455/200.1 |
| 2009/0024550 A1 | 1/2009 | Wynn et al. |
| 2009/0028082 A1 | 1/2009 | Wynn et al. |
| 2009/0032592 A1 | 2/2009 | Christensen |
| 2009/0033359 A1 | 2/2009 | Rofougaran et al. |
| 2009/0036067 A1 | 2/2009 | Rofougaran et al. |
| 2009/0037627 A1 | 2/2009 | Rofougaran et al. |
| 2009/0058734 A1 | 3/2009 | Ali et al. |
| 2009/0067388 A1 | 3/2009 | van Rooyen et al. |
| 2009/0073065 A1 | 3/2009 | Jordan |
| 2009/0074106 A1 | 3/2009 | See et al. |
| 2009/0115549 A1 | 5/2009 | Lee |
| 2009/0121021 A1* | 5/2009 | Wang et al. .................. 235/439 |
| 2009/0121951 A1 | 5/2009 | Kaneda |
| 2009/0128446 A1 | 5/2009 | Gummalla et al. |
| 2009/0135087 A1 | 5/2009 | Gummalla et al. |
| 2009/0148074 A1 | 6/2009 | Xu et al. |
| 2009/0160575 A1 | 6/2009 | Dupuy et al. |
| 2009/0160578 A1 | 6/2009 | Achour |
| 2009/0167457 A1 | 7/2009 | Melde et al. |
| 2009/0180403 A1 | 7/2009 | Tudosoiu |
| 2009/0218657 A1 | 9/2009 | Rofougaran et al. |
| 2009/0219213 A1 | 9/2009 | Lee et al. |
| 2009/0227205 A1 | 9/2009 | Rofougaran et al. |
| 2009/0237180 A1* | 9/2009 | Yoshida ....................... 333/189 |
| 2009/0245146 A1 | 10/2009 | Gummalla et al. |
| 2009/0251385 A1 | 10/2009 | Xu et al. |
| 2009/0285135 A1 | 11/2009 | Rousu et al. |
| 2009/0289737 A1 | 11/2009 | Itoh et al. |
| 2009/0295473 A1 | 12/2009 | Dupuy et al. |
| 2009/0295483 A1 | 12/2009 | Alidio et al. |
| 2009/0295660 A1 | 12/2009 | Xu et al. |
| 2009/0316612 A1 | 12/2009 | Poilasne et al. |
| 2009/0322490 A1 | 12/2009 | Kung et al. |
| 2009/0323783 A1 | 12/2009 | Buris et al. |
| 2010/0022195 A1 | 1/2010 | Rofougaran et al. |
| 2010/0045554 A1 | 2/2010 | Xu et al. |
| 2010/0060544 A1 | 3/2010 | Penev et al. |
| 2010/0073254 A1 | 3/2010 | Lee et al. |
| 2010/0077115 A1 | 3/2010 | Rofougaran et al. |
| 2010/0079347 A1 | 4/2010 | Hayes et al. |
| 2010/0109805 A2 | 5/2010 | Achour |
| 2010/0109971 A2 | 5/2010 | Gummalla et al. |
| 2010/0109972 A2 | 5/2010 | Xu et al. |
| 2010/0110943 A2 | 5/2010 | Gummalla et al. |
| 2010/0117908 A2 | 5/2010 | Lee et al. |
| 2010/0123635 A1 | 5/2010 | Lopez et al. |
| 2010/0127085 A1 | 5/2010 | Yamagajo et al. |
| 2010/0157858 A1 | 6/2010 | Lee et al. |
| 2010/0171563 A1 | 7/2010 | Dupuy et al. |
| 2010/0176880 A2 | 7/2010 | Dupuy et al. |
| 2010/0207703 A1 | 8/2010 | Dupuy et al. |
| 2010/0225554 A1 | 9/2010 | Huang et al. |
| 2010/0231464 A1 | 9/2010 | Huang et al. |
| 2010/0231470 A1 | 9/2010 | Lee et al. |
| 2010/0232474 A1 | 9/2010 | Rofougaran et al. |
| 2010/0238075 A1 | 9/2010 | Pourseyed |
| 2010/0238081 A1 | 9/2010 | Achour et al. |
| 2010/0276498 A1 | 11/2010 | Rofougaran et al. |
| 2010/0283692 A1 | 11/2010 | Achour et al. |
| 2010/0283705 A1 | 11/2010 | Achour et al. |
| 2010/0285634 A1 | 11/2010 | Rofougaran et al. |
| 2011/0026624 A1 | 2/2011 | Gummalla et al. |
| 2011/0039501 A1 | 2/2011 | Achour et al. |
| 2011/0050364 A1 | 3/2011 | Achour |
| 2011/0066774 A1 | 3/2011 | Rofougaran et al. |
| 2011/0068873 A1 | 3/2011 | Alidio et al. |
| 2011/0095950 A1 | 4/2011 | Yu |
| 2011/0095964 A1 | 4/2011 | Pathak et al. |
| 2011/0109402 A1 | 5/2011 | Dupuy et al. |
| 2011/0136457 A1 | 6/2011 | Yu |
| 2011/0148586 A1 | 6/2011 | Anderson et al. |
| 2011/0153349 A1 | 6/2011 | Anderson et al. |
| 2011/0174877 A1 | 7/2011 | Fleck et al. |
| 2011/0175789 A1* | 7/2011 | Lee et al. ..................... 343/853 |
| 2013/0285767 A1* | 10/2013 | Visconti et al. ............... 333/173 |

OTHER PUBLICATIONS

European Patent Office, European Patent Application No. 10191449.1, Communication Extended Search Report, dated Feb. 21, 2011 (11 pages).

(56) References Cited

OTHER PUBLICATIONS

European Patent Office, Partial European Search Report, European Patent Application Number: 10176444.7, dated Feb. 11, 2011 (8 pages).
Hawaii International Conference on, IEEE, Piscataway, NJ, USA, Dynamic Dispatching and Transport Optimization—Real-World Experience with Perspectives on Pervasive Technology Integration, dated Jan. 5, 2009 (9 pages).
S. Lee and C.T.-C Nguyen, "Influence of Automatic Level Control on Micromechanical Resonator Oscsillator Phase Noise," proceedings, 2003 IEEE Int. Frequency Control Symposium, Tampa, Florida, May 5-8, 2003, pp. 341-349. (9 pages).
State Intellectual Property Office, P.R. China, Notice of Amendment, Chinese Application No. 201010544113.X, Dated Dec. 7, 2010, (2 pages).
www.nano.gatech.edu/news/release.php, Georgia Institute of Technology: Nanoscience and Nanotechnology, "Researchers Win $3.5 Million to Improve Wireless," Website, Aug. 5, 2010, (3 pages).
U.S. Appl. No. 12/621,914 filed with the United States Patent and Trademark Office Nov. 19, 2009.
U.S. Appl. No. 12/567,158 filed with the United States Patent and Trademark Office Nov. 19, 2009.
U.S. Appl. No. 13/211,568, filed with the United States Patent and Trademark Office Aug. 17, 2011 (35 pages).
U.S. Appl. No. 13/211,575, filed with the United States Patent and Trademark Office, Aug. 17, 2011 (27 pages).
EPC Global, Specification for RFID Air Interface, dated Jan. 31, 2005 (94 pages).
European Patent Office, European Search Report, European Patent Application Number: 10176444.7, dated Jun. 6, 2011 (5 pages).

\* cited by examiner

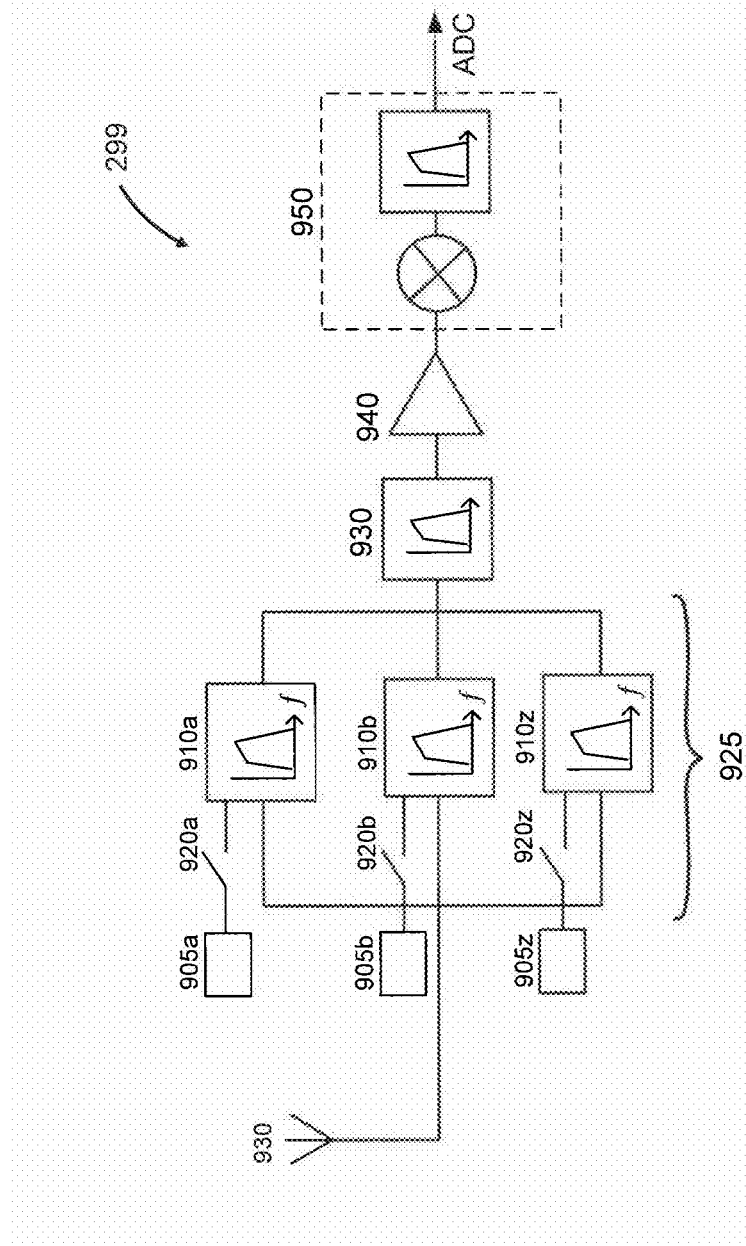

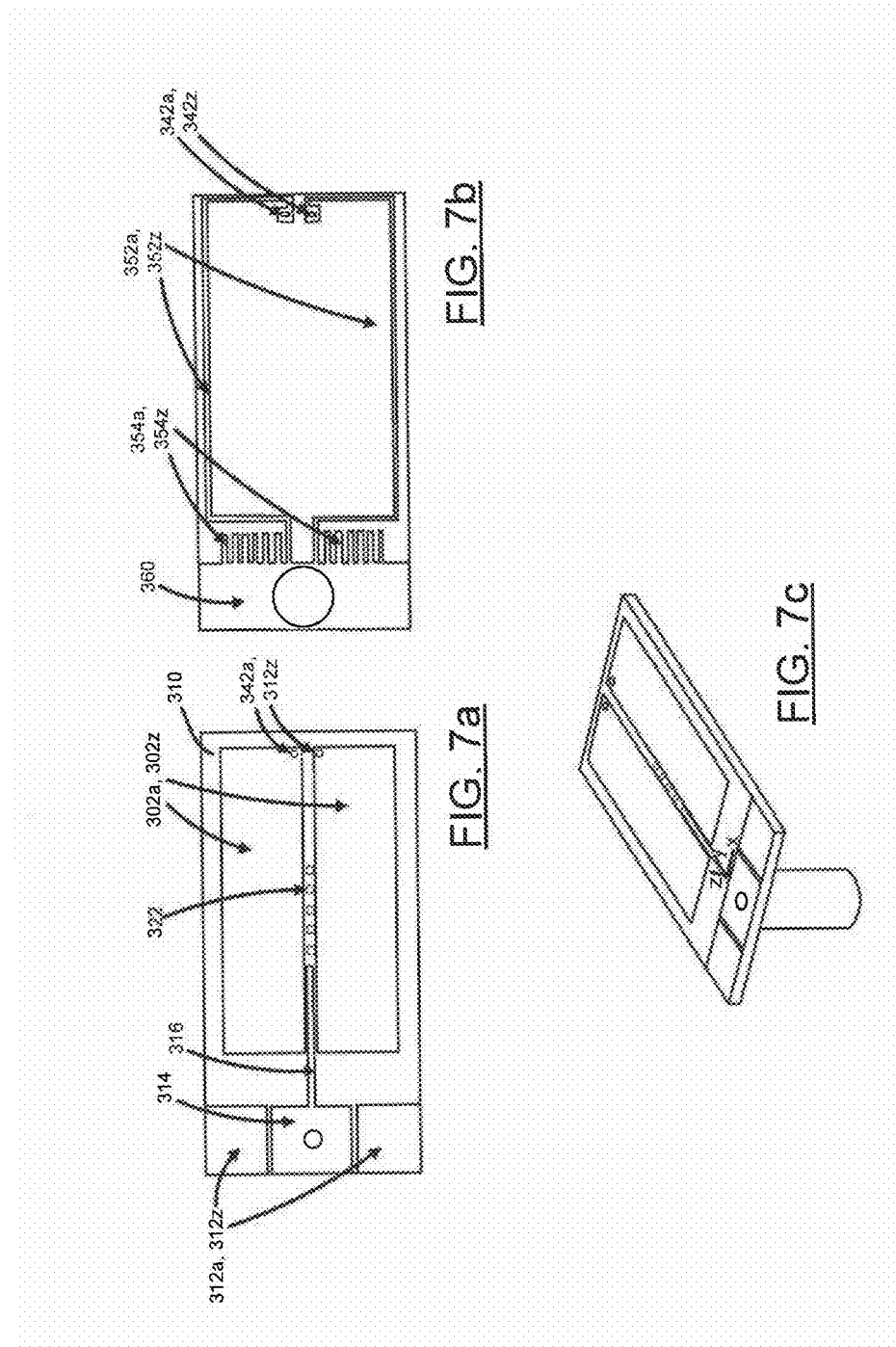

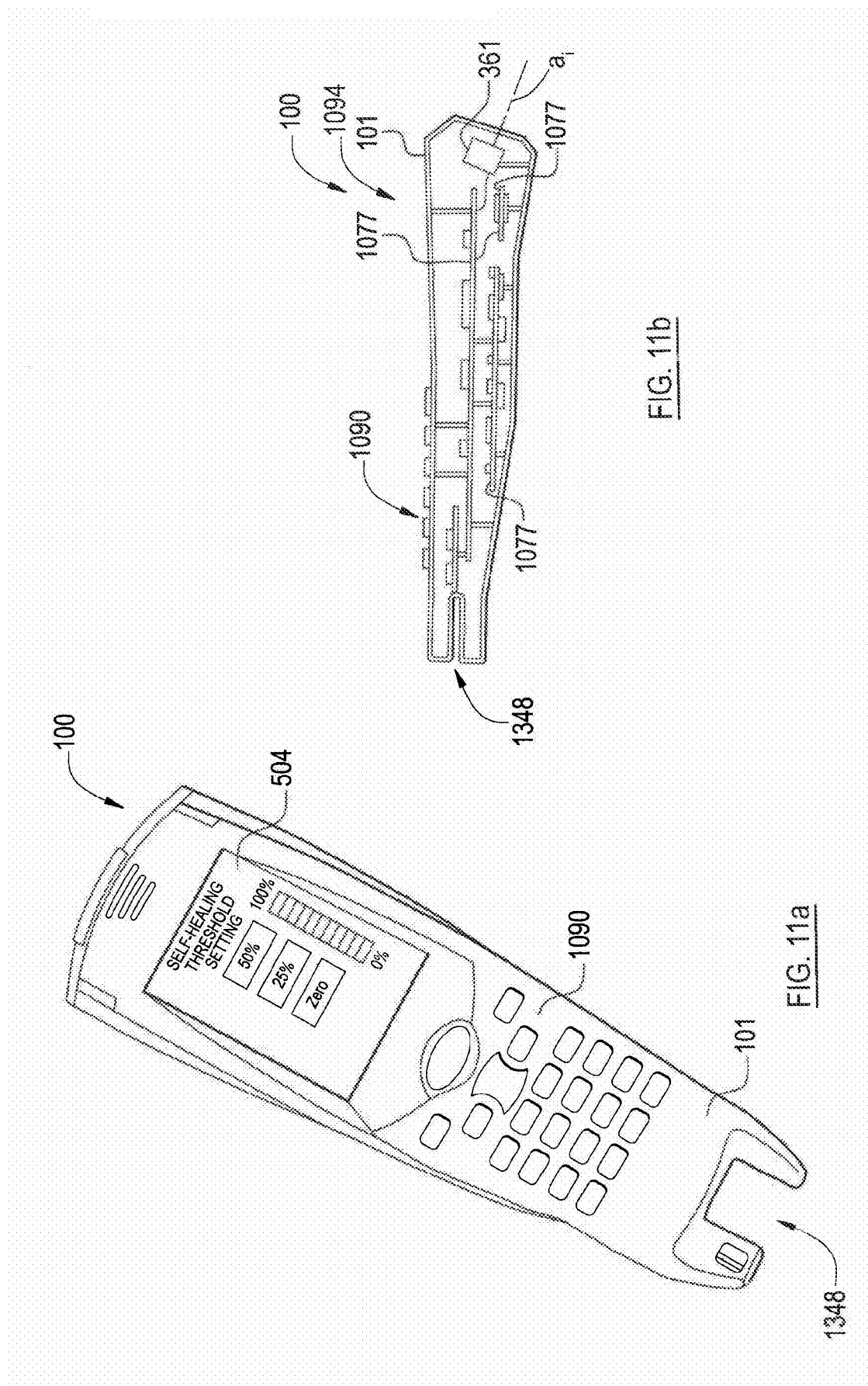

ENCODED INFORMATION READING TERMINAL WITH MICRO-ELECTROMECHANICAL RADIO FREQUENCY FRONT END

FIELD OF THE INVENTION

The invention is generally related to encoded information reading (EIR) terminals and is specifically related to an EIR terminal utilizing a micro-electromechanical radio frequency front end.

BACKGROUND OF THE INVENTION

Encoded information reading (EIR) terminals equipped with wireless communication interfaces are widely used in retail stores, shipping facilities, etc. While wireless communication of EIR terminals offer many advantages as compared to wired communications, traditional wireless communication interfaces have noticeable shortcomings, e.g., by failing to support more than one communication protocol and/or standard.

Accordingly, there is a need for further advances in EIR terminals and systems which would support multiple communication protocols and standards.

SUMMARY OF THE INVENTION

In one embodiment, there is provided an encoded information reading (EIR) terminal comprising a microprocessor electrically coupled to a system/data bus, a memory communicatively coupled to the microprocessor, an EIR device, a multi-band antenna, and a wireless communication interface.

The EIR device can be provided by a bar code reading device, an RFID reading device, or a card reading device. The EIR device can be configured to output raw message data containing an encoded message and/or output decoded message data corresponding to an encoded message.

The wireless communication interface can comprise a radio frequency (RF) front end electrically coupled to the multi-band antenna. The RF front end can comprise a micro-electromechanical (MEMS) filter array including one or more band-pass filter. Each band-pass filter of the MEMS filter array can be electrically coupled to a bias voltage source or an oscillating signal source.

The RF front end can be electrically coupled to an analog-to-digital (A/D) converter and/or to a digital-to-analog (D/A) converter. The wireless communication interface can be configured to transmit radio signals in one or more frequency regulatory domains and/or receive radio signals in one or more frequency regulatory domains.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4a and 4b depict electrical diagrams of two illustrative embodiments of a radio frequency front end including micro-electromechanical elements;

FIGS. 6-10 illustrate various embodiments of metamaterial (MTM) antennas;

FIGS. 11a and 11b illustrate an exemplary hand held EIR terminal housing;

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is provided an encoded information reading (EIR) terminal for incorporation in a data collection system. The data collection system, schematically shown in FIG. 1, can include a plurality of EIR terminals 100a-100z in communication with a plurality of interconnected networks 110a-110z.

In a further aspect, an EIR terminal can comprise a communication interface which can be used by the terminal to connect to one or more networks 110a-110z. In one embodiment, the communication interface can be provided by a wireless communication interface.

In another aspect, the plurality of networks 110a-110z can include at least one IEEE 802.11-conformant wireless network. In another aspect, an EIR terminal 100a can be in communication with at least one wireless device over Bluetooth™ wireless communication protocol. In a further aspect, the plurality of networks 110a-110z can include at least one GSM wireless network. In a further aspect, the plurality of networks 110a-110z can include at least one CDMA wireless network. In a further aspect, the plurality of networks 110a-110z can include at least one 3G wireless network, e.g., UMTS, HSUPA/HSDPA, or CDMA2000EvDO. In a further aspect, the plurality of networks 110a-110z can include at least one 4G wireless network, e.g., LTE, UWB, or IEEE 802.16m (WiMax). In a further aspect, the plurality of networks 110a-110z can include at least one Low Rate Wireless Personal Area Network (LR-WPAN), e.g., a IEEE 802.15 (Zigbee)-conformant wireless network. A skilled artisan would appreciate the fact that wireless networks implementing other wireless communication protocols are within the scope of this disclosure.

In a further aspect, an EIR terminal 100c can establish a communication session with the host computer 171. In one embodiment, network frames can be exchanged by the EIR terminal 100c and the host computer 171 via one or more routers, base stations, and other infrastructure elements. In another embodiment, the host computer 171 can be reachable by the EIR terminal 100c via a local area network (LAN). In a yet another embodiment, the host computer 171 can be reachable by the EIR terminal 100c via a wide area network (WAN). A skilled artisan would appreciate the fact that other methods of providing interconnectivity between the EIR terminal 100c and the host computer 171 relying upon LANs, WANs, virtual private networks (VPNs), and/or other types of network are within the scope of this disclosure.

In one embodiment, the communications between the EIR terminal 100c and the host computer 171 can comprise a series of HTTP requests and responses transmitted over one or more TCP connections, although a person skilled in the art would appreciate the fact that using other transport and application level protocols is within the scope of this disclosure.

Figure 1:
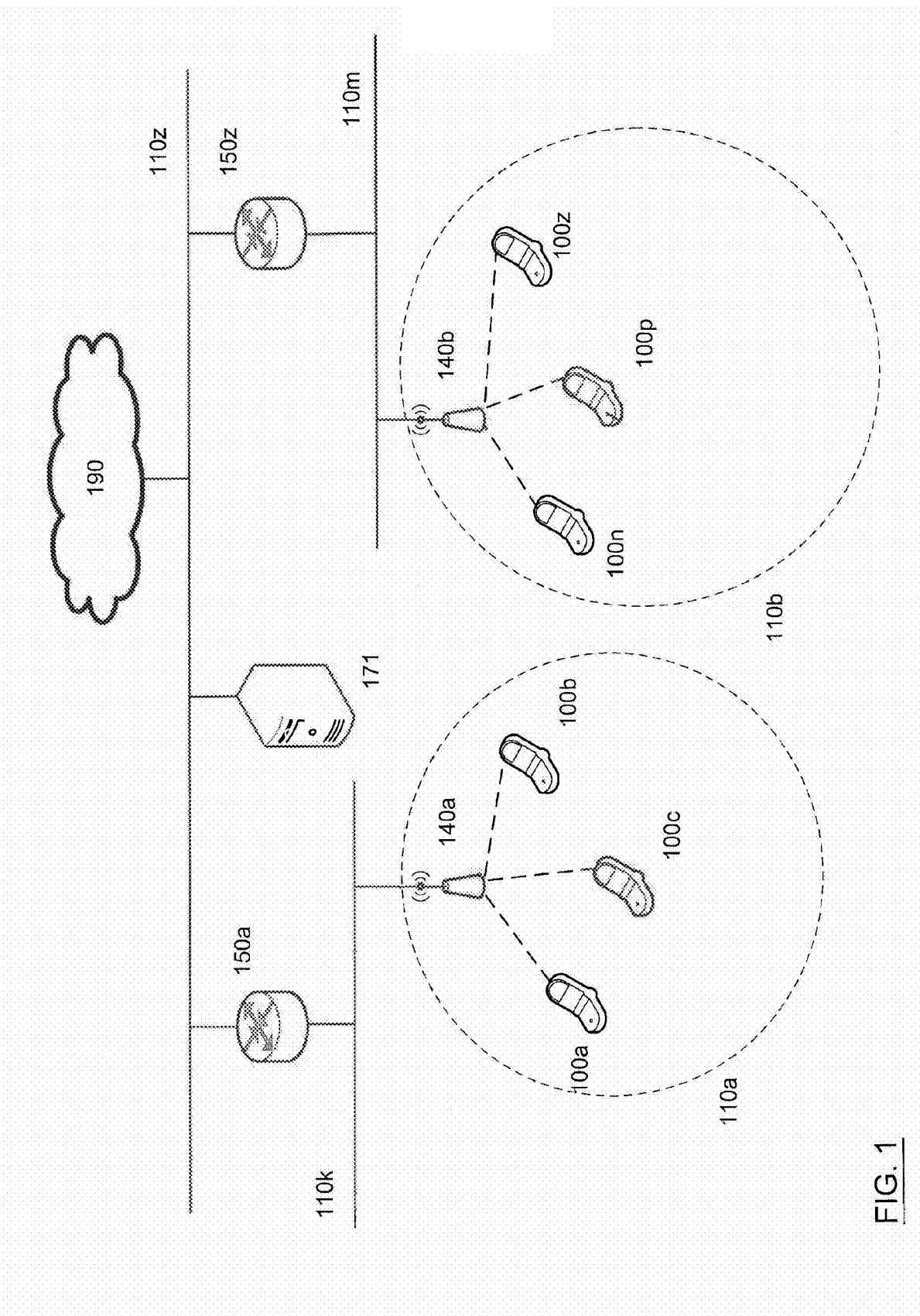
FIG. 1 depicts a network-level layout of a data collection system employing EIR terminals.
Figure 2:
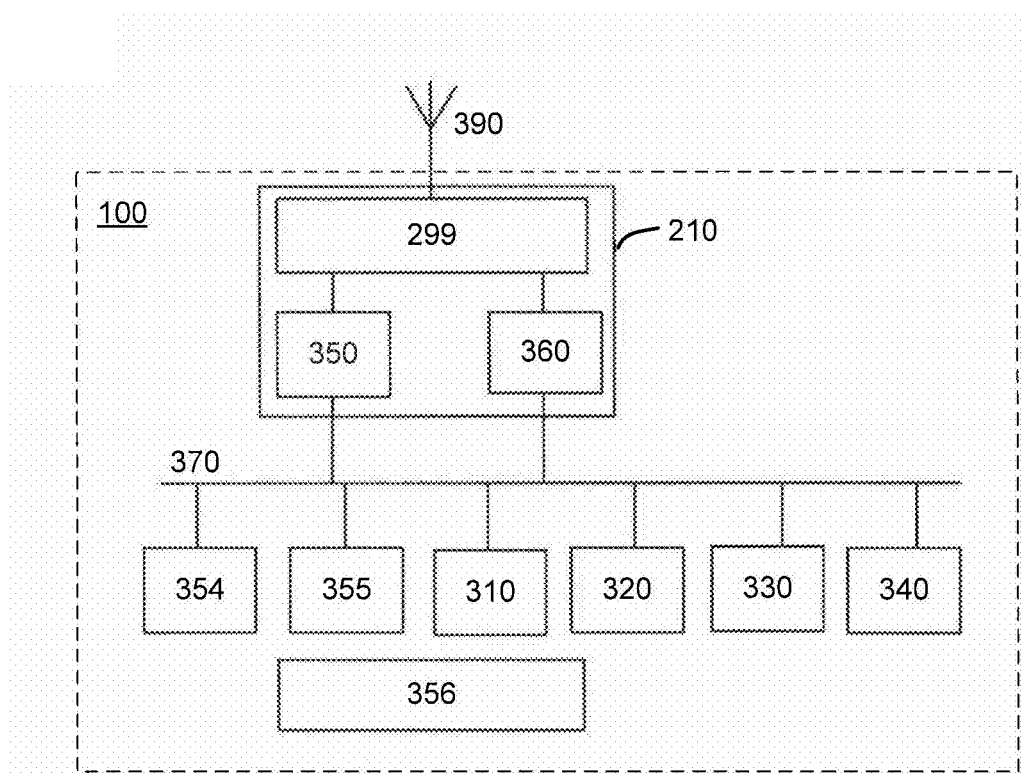
FIG. 2 depicts component-level layout of the EIR terminal 100 of FIG. 1.

Component-level diagram of one embodiment of an EIR terminal 100 is now being described with references to FIG. 2. The EIR terminal 100 of FIG. 1 can comprise at least one microprocessor 310 and a memory 320, both coupled to the system/data bus 370.

The microprocessor 310 can be provided by a general purpose microprocessor or by a specialized microprocessor (e.g., an ASIC). In one embodiment, the EIR terminal 100 can comprise a single microprocessor which can be referred to as a central processing unit (CPU). In another embodiment, the EIR terminal 100 can comprise two or more microprocessors, for example a CPU providing some or most of the EIR terminal functionality and a specialized microprocessor performing some specific functionality. A skilled artisan would appreciate the fact that different schemes of processing tasks distribution among the two or more microprocessors are within the scope of this disclosure.

The EIR terminal 100 can further comprise a communication interface communicatively coupled to the system/data bus 370. In one embodiment, the system/data bus can be provided by two or more buses, including, e.g., instructions bus and data bus. In another aspect, the communication interface can be provided by a wireless communication interface 210. In one embodiment, the wireless communication interface can be configured to support at least one protocol of the IEEE 802.11/802.15/802.16 protocol family. In another embodiment, the wireless communication interface can be configured to support at least one protocol of the HSPA/GSM/GPRS/EDGE protocol family. In another embodiment, the wireless communication interface can be configured to support TDMA protocol. In another embodiment, the wireless communication interface can be configured to support UMTS protocol. In another embodiment, the wireless communication interface can be configured to support LTE protocol. In another embodiment, the wireless communication interface can be configured to support at least one protocol of the CDMA/1xEV-DO protocol family. A skilled artisan would appreciate the fact that wireless communication interfaces supporting other communication protocols are within the scope of this disclosure.

The EIR terminal 100 can further comprise a keyboard interface 354 and a display adapter 355, both also coupled to the system/data bus 370. The EIR terminal 100 can further comprise a battery 356. In one embodiment, the battery 356 can be provided by a replaceable rechargeable battery pack.

The EIR terminal 100 of FIG. 1 can further comprise one or more encoded information reading (EIR) devices 330, including a bar code reading device, an RFID reading device, and a card reading device, also coupled to the system/data bus 370. In one embodiment, an EIR reading device can be capable of outputting decoded message data corresponding to an encoded message. In another embodiment, the EIR reading device can output raw message data containing an encoded message, e.g., raw image data or raw RFID data.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA capable of reading bar codes is a device that reads bar codes for purposes of the present disclosure.

As mentioned herein supra, EIR terminal 100 of FIG. 1 is capable of transmitting messages to the host computer 171 of FIG. 1 or to other devices connected to one of the networks 110a-110z of FIG. 1. In one aspect, at least one of the messages transmitted by the EIR terminal can include decoded message data corresponding to, e.g., a bar code label or an RFID label attached to a product or to a shipment item. For example, an EIR terminal can transmit a request to the host computer to retrieve product information corresponding to a product identifier encoded by a bar code label attached to the product, or to transmit an item tracking record for an item identified by a bar code label attached to the product. In a further aspect, responsive to transmitting a request to the host computer, the EIR terminal can receive from the host computer product information corresponding to a product identifier encoded by a bar code label attached to the product.

Figure 3:
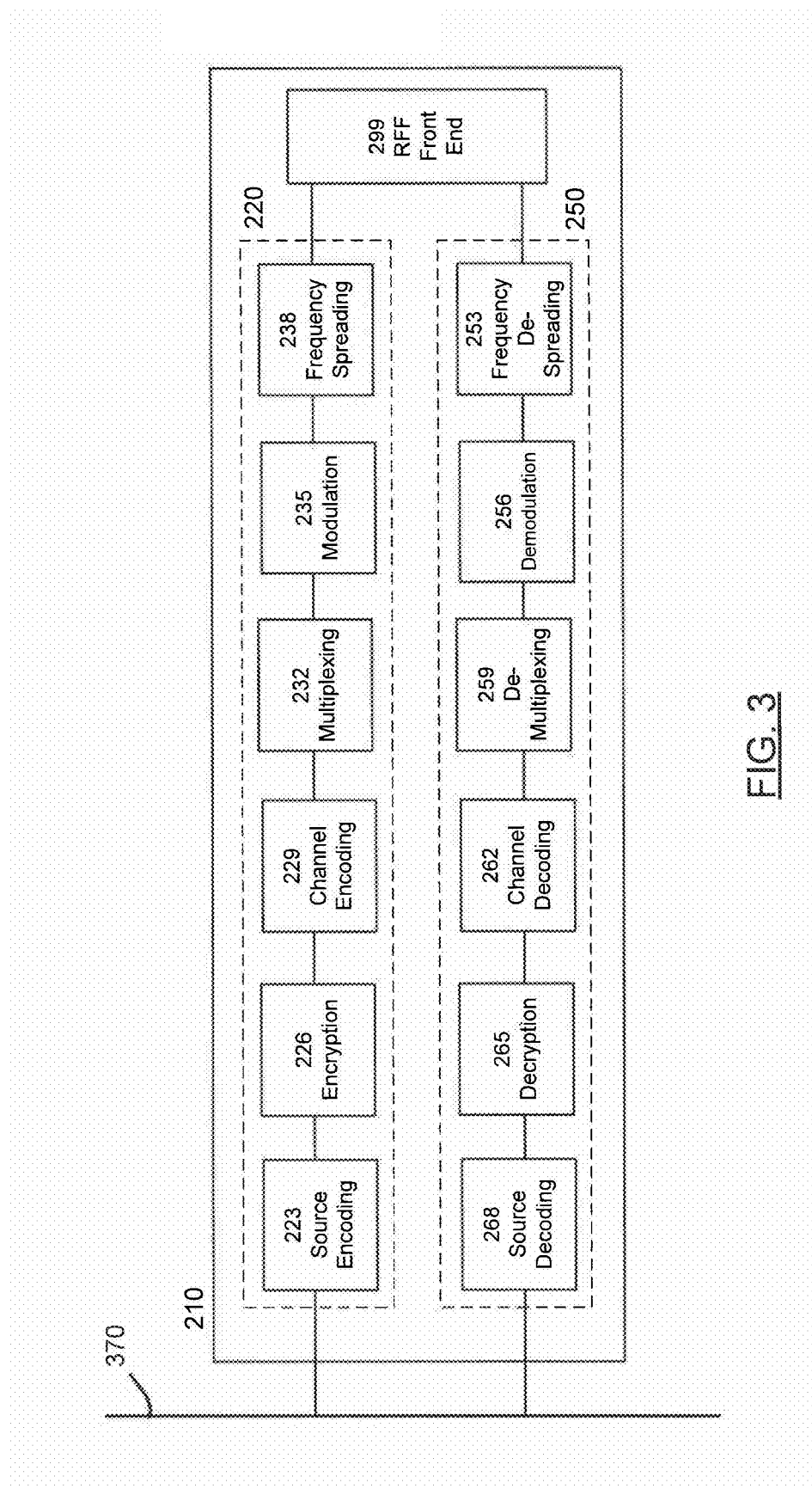
FIG. 3 depicts a functional layout of a wireless communication interface.

The wireless communication interface 210 is now being described with references to FIG. 3. In one embodiment, the wireless communication interface 210 can comprise a transmitter circuit 220 electrically coupled to a data source (not shown in FIG. 3) via system/data bus 370. The transmitter circuit 220 can be implemented by one or more specialized microchips, and can perform the following functions: source encoding 223, encryption 226, channel encoding 229, multiplexing 232, modulation 235, and frequency spreading 238.

The wireless communication interface 210 of FIG. 3 can further comprise a receiver circuit 250 electrically coupled to the data sink (not shown in FIG. 3) via system/data bus 370. The receiver circuit 250 can be implemented by one or more specialized microchips, and can perform the following functions: frequency de-spreading 253, demodulation 256, de-multiplexing 259, channel decoding 262, decryption 265, and source decoding 268.

Each of the transmitter circuit 220 and receiver circuit 250 can be electrically coupled to a radio frequency (RF) front end 299. The RF front end 299 can be used to convert high frequency RF signals to/from base-band or intermediate frequency signals.

In one embodiment, the RF front end can be electrically coupled to a multi-band antenna 390 best viewed in FIG. 2. The multi-band antenna can be configured to receive and transmit RF signals within at least one frequency regulatory domain. The frequency regulatory domains supported by the multi-band antenna can include 800 MHz, 850 MHz, 900 MHz, 1700 MHz, 1800 MHz, 1900 MHz, 2100 MHz, 2400 MHZ, and 5 GHz. A skilled artisan would appreciate the fact that multi-band antennas supporting other frequency regulatory domains are within the scope of this disclosure. In a further aspect, the multi-band antenna can support two or more frequency regulatory domains.

In one embodiment, the RF front end, in order to process modulated RF signals received by the antenna into based-band signals, can comprise one or more band-pass filter, a low noise amplifier, and a down-conversion mixer-filter. In a further aspect, the band-pass filter can be electrically coupled to the multi-band antenna.

In one embodiment, the band-pass filter can be provided by an array of band-pass filters manufactured using micro-electromechanical systems (MEMS) technology. In an illustrative embodiment shown in FIG. 4a, the array of band-pass filters can comprise two or more filters 410a-410z and two or more switches 420a-420z. In another embodiment, the array of band-pass filters can be provided by a single filter electrically coupled to a bias voltage source via a switch.

Referring again to FIG. 4a, opening a switch 420a-420z disconnects bias voltage supply 425 to the corresponding filter 410a-410z and thus effectively disables any current through the corresponding filter 410a-410z. Hence, the positions of the switches 420a-420z can determine which of the filters 410a-410z are selected for filtering the RF signal supplied by the antenna 430. The bias voltage 425 can be provided by a DC or AC voltage.

Figure 4A:
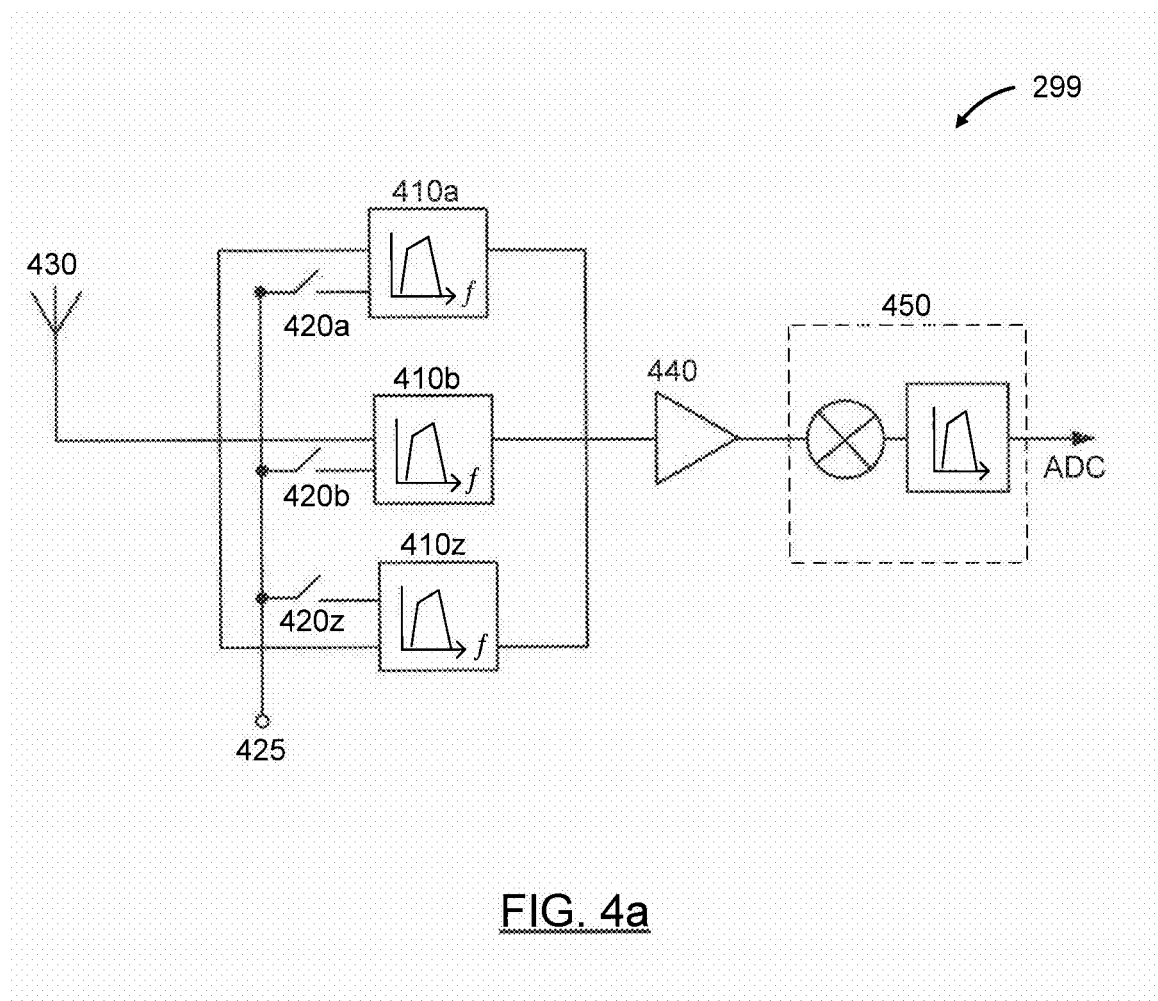

In the illustrative embodiment schematically shown in FIG. 4a, the RF front end can further comprise a low noise amplifier 440 and a down-conversion filter-mixer 450. In one embodiment, the down-conversion filter-mixer 450 can be manufactured using micro-electromechanical systems (MEMS) technology. In one embodiment, the RF front end can further comprise an individual down conversion mixer for each signal corresponding to the frequencies of filters 410a-410z.

In a further aspect, the output of the RF front end 299 can be electrically coupled to an analog-to-digital converter (not shown in FIG. 4a).

In another illustrative embodiment schematically shown in FIG. 4b, the RF front end can comprise a filter-mixer circuit 925. The filter-mixer circuit 925 can include two or more band-pass filters 910a-910z and two or more oscillating signal sources 905a-905z. Each of the band-pass filters 910a-910z can be connected to an oscillating signal source 905a-905z via a switch 920a-920z. The RF signal supplied by the antenna 390 can be mixed with two or more oscillating signals 905a-905z and filtered by the filter-mixer circuit 925. In another embodiment, the filter-mixer circuit can be provided by a single filter electrically coupled to an oscillating signal source.

In another embodiment, the frequencies of oscillating signals can form an arithmetic progression having a pre-defined initial term and a pre-defined common difference. For example, in the illustrative embodiment of FIG. 4b, the oscillating signal source 905a has a frequency of 2400 MHz, the oscillating signal source 905b has a frequency of 2425 MHz, and the oscillating signal source 905z has a frequency of 2450 MHz. In a further aspect, the center frequencies of the band-pass filters 910a-910z can form an arithmetic progression having a pre-defined initial term and a pre-defined common difference. For example, in the illustrative embodiment of FIG. 4b, the band-pass filter 910a has a center frequency of 2412 MHz, the band-pass filter 910b has a center frequency of 2437 MHz, and the band-pass filter 910a has a center frequency of 2462 MHz. Selection of the pre-defined values of the frequencies of the oscillating signals 905a-905z and the center frequencies of the band-pass filters 910a-910z can effectively determine two or more operating frequency bands for the RF front end.

In a further aspect, the RF front end can further comprise a band-pass filter 930, a low noise amplifier 940 and a down-conversion filter-mixer 950. In one embodiment, the down-conversion filter-mixer 950 can be manufactured using micro-electromechanical systems (MEMS) technology.

In a further aspect, the output of the RF front end 299 can be electrically coupled to an analog-to-digital converter (not shown in FIG. 4b).

In a further aspect, on the transmitting side, the RF frond-end area can be described as a "mirrored" version of a receiver. The front end of a transmitter up converts an outgoing base band signal and then feeds the signal to a high power amplifier.

As mentioned herein supra, the array of band-pass filters 410a-410z can be manufactured using micro-electromechanical systems (MEMS) technology.

Figure 5A:
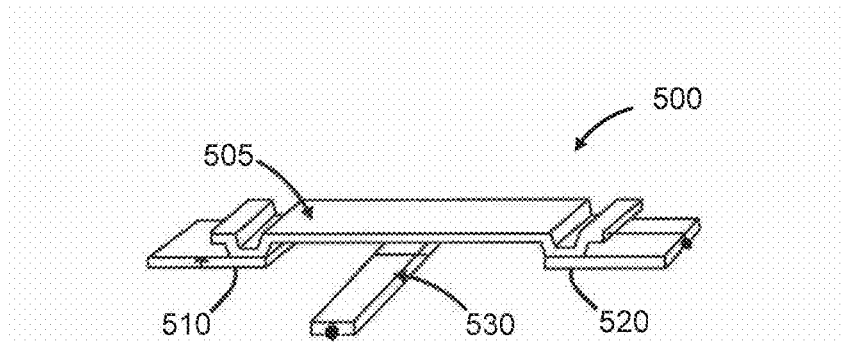
FIG. 5a illustrates a perspective view of a micro-electromechanical flexural-mode beam element with clamped ends.

In one embodiment, a micro-electromechanical resonator can be implemented using micro-electromechanical flexural-mode beam elements with clamped ends, best viewed in FIG. 5a. The resonator 500 can include a beam 505 clamped at both ends 510, 520, and an electrode 530. Both the beam 505 and the electrode 530 can be made of conductive materials, such as doped silicon, or a metal.

In a further aspect, a beam element can be used as a band-pass filter, by applying a DC bias voltage to the beam, while applying an AC excitation signal to the electrode, thus causing a dominant force component to drive the beam into mechanical resonance and hence creating a DC-biased time-varying capacitance between the electrode and the resonator.

Figure 5B:
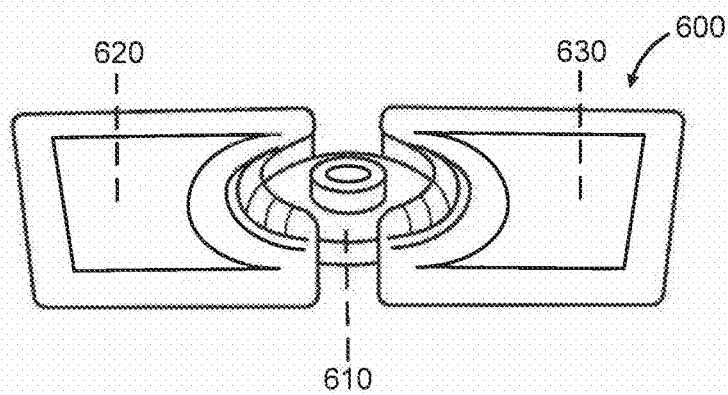
FIG. 5b illustrates a perspective view of a disk-shaped micro-electromechanical resonator element.

In another embodiment, a micro-electromechanical resonator can be implemented using disk-shaped resonator elements. A disk-shaped resonator element 600 can include a silicon or diamond disk 610 supported in the middle and surrounded by input and output electrodes 620, 630 as shown in FIG. 5b. When vibrating in its radial contour mode, the disk can expand and contract around its perimeter.

In a further aspect, two or more micro-electromechanical resonator elements can be grouped together into an array selectable by a switch as shown in FIG. 4.

A skilled artisan would appreciate the fact that other ways of implementing the RF front end are within the scope of this disclosure.

In a further aspect, at least some of the functions of the transmitter circuit and the receiver circuit can be advantageously performed by one or more software programs executed by microprocessor 310 of FIG. 2. In one embodiment, the EIR terminal 100 can comprise a single microprocessor which can be referred to as a central processing unit (CPU) and which can perform at least some of the functions of the transmitter circuit and the receiver circuit. In another embodiment, the EIR terminal 100 can comprise two or more microprocessors, for example a CPU providing some or most of the EIR terminal functionality and a specialized microprocessor performing some of the functions of the transmitter circuit and the receiver circuit. A skilled artisan would appreciate the fact that different schemes of processing tasks distribution among the two or more microprocessors are within the scope of this disclosure.

As mentioned herein supra, the wireless communication interface 210 can further comprise an analog-to-digital (A/D) converter 350, as shown in FIG. 2. The input of the A/D converter 350 which can be electrically coupled to the RF front end 299. The choice of A/D converter can be determined by the receiver architecture, and can depend upon the selectivity of the filters, the dynamic range afforded by the front-end amplifiers, and the bandwidth and type of modulation to be processed. For example, the level or dynamic range of signals expected to be presented to the A/D converter will dictate the bit resolution needed for the converter.

In another embodiment, the wireless communication interface 210 can further comprise a digital-to-analog (D/A) converter 360, as shown in FIG. 2. The output of the D/A converter can be electrically coupled to the RF front end 299. In a further aspect, a D/A converter can be viewed as a component providing a function reversed to that of an A/D converter.

In a further aspect, the output of the A/D converter 350, and the input of the D/A conveter 360 can be electrically coupled to a system/data bus 370, as best viewed in FIG. 2. A skilled artisan would appreciate the fact that other microprocessors, memory and/or peripheral devices can be electrically coupled to the system/data bus 370 without departing from the scope of this disclosure.

In another aspect, the microprocessor 310 can execute a base band encoder software program which can encode a bit stream which needs to be transmitted over a wireless medium. The encoded bit stream outputted by the base band encoder software program can be fed to the input of the D/A converter 360. The analog signal representative of the encoded bit stream can be outputted by the D/A converter 360 to the RF front end 299 in order to be transmitted over a wireless medium.

In one embodiment, the base band encoder software program can perform at least one of the following functions: source encoding of a bit stream, encryption, channel encoding, multiplexing, modulation, frequency spreading, and media access control. In one embodiment, the remaining functions (i.e. those not implemented by the base band encoder software program) can be implemented by one or more dedicated hardware components.

In another aspect, the RF front end 299 can output to the A/D converter 350 an analog signal representative of a signal received over the wireless medium. The A/D converter 350 can output a digital signal representative of the analog signal outputted by the RF front end 299. The microprocessor 310 can execute a base band decoder software program which can input the digital signal outputted by the A/D converter 350 and can decode the digital signal into a form suitable for further processing by other software programs.

In a further aspect, the base band decoder software program can perform at least at least one of the following functions: media access control, frequency de-spreading, de-modulation, de-multiplexing the analog signal, channel decoding, decryption, and source decoding. In one embodiment, the remaining functions (i.e., those not implemented by the base band decoder software program) can be implemented by one or more dedicated hardware components.

In one aspect, each of the frequency de-spreading, de-modulation, de-multiplexing, channel decoding, decryption, and source decoding functions can be implemented as a reverse function of the frequency spreading, modulation, multiplexing, channel encoding, encryption, and source encoding functions, respectively.

In another aspect, the base band encoder software program can be implemented as two or more software programs. In another aspect, the base band decoder software program can be implemented as two or more software programs. In a further aspect, the base band encoder software program and the base band decoder software program can be implemented as a single software program.

In another aspect, due to advantageously performing at least some of the source bit stream encoding functions by a software program, the EIR terminal 100 can be devoid of dedicated hardware components configured to implement at least one of the following functions: source encoding of the input bit stream, encryption, channel encoding, multiplexing, modulation, frequency spreading, and media access control.

In another aspect, due to advantageously performing at least some of the analog signal decoding functions by a software program, the EIR terminal 100 can be devoid of dedicated hardware components configured to implement at least one of the following functions: media access control, frequency de-spreading, de-modulation, de-multiplexing, channel decoding, decryption, and source decoding.

In a further aspect, the microprocessor 310 of FIG. 2 can execute an operating frequency selector software program. The operating frequency selector software program can dynamically control the switch 420 of FIG. 4 in order to select an operating frequency of the EIR terminal's RF front end 299.

As noted herein supra, in one embodiment, the EIR terminal 100 can comprise a single microprocessor which can be referred to as a central processing unit (CPU). In one embodiment the operating frequency selector software program can be executed by the CPU. In another embodiment, the EIR terminal 100 can comprise two or more microprocessors, for example a CPU providing some or most of the EIR terminal functionality and a specialized microprocessor executing the operating frequency selector software program. A skilled artisan would appreciate the fact that different schemes of processing tasks distribution among the two or more microprocessors are within the scope of this disclosure.

In a further aspect, selecting the operating frequency of the RF front end allows EIR terminal to select a wireless communication network and/or wireless communication protocol. In one embodiment, the EIR terminal can be configured to search beacon signals over a pre-defined frequency range (e.g., between 800 MHz and 5 GHz), and then select the operating frequency which would allow the EIR terminal to operate within the selected wireless communication network and/or wireless communication protocol.

In one embodiment, the operating frequency selector software program can be configured to select the operating frequency based on the estimated cost of data transmission over the selected wireless communication network and/or wireless communication protocol. In a further aspect, the operating frequency selector software program can, by selecting a wireless communication network and/or wireless communication protocol, optimize the estimated cost of data transmission while keeping the data transmission rate above a pre-set threshold value.

In one embodiment, the operating frequency selector software program can be configured to select the operating frequency based on the amount of data to be transmitted over the selected wireless communication network and/or wireless communication protocol. In a further aspect, the operating frequency selector software program can, by selecting a wireless communication network and/or wireless communication protocol, optimize the transmission elapsed time while keeping the data transmission cost below a pre-set threshold value.

In one embodiment, the operating frequency selector software program can be configured to select the operating frequency based on the estimated rate of data transmission over the selected wireless communication network and/or wireless communication protocol. In a further aspect, the operating frequency selector software program can, by selecting a wireless communication network and/or wireless communication protocol, optimize the data transmission rate while keeping the data transmission cost below a pre-set threshold value.

In one embodiment, the operating frequency selector software program can be configured to select the operating frequency based on the estimated quality of the data transmission channel over the selected wireless communication network and/or wireless communication protocol. In a further aspect, the operating frequency selector software program can, by selecting a wireless communication network and/or wireless communication protocol, optimize the data transmission quality while keeping the data transmission cost below a pre-set threshold value.

A skilled artisan would appreciate the fact that other criteria of selecting the operating frequency are within the scope of this disclosure.

In one embodiment, the operating frequency can be selected immediately before the EIR terminal attempts to initiate a communication session. In another embodiment, the operating frequency can be selected periodically at established time intervals so that the EIR terminal can change the operating frequency between communication sessions or during a communication session if a wireless communication network and/or a wireless communication protocol is detected yielding a value of one or more of the above criteria which is closer to the optimum than that of the current network or protocol. In a yet another embodiment, the operating frequency can be selected responsive to a pre-defined event (e.g., the signal quality falling below a pre-defined level), so that the EIR terminal can automatically (i.e., without user intervention) change the wireless communication network and/or the wireless communication protocol between communication sessions or during a communication session. Thus, the EIR terminal can always maintain a network connection irrespectively of changing external conditions (e.g., when the terminal is physically moved).

Due to its ability to dynamically select the operating frequency of the RF front end, the EIR terminal 100 can be advantageously used, e.g., by a company operating in several geographies with different wireless communication standards. Using the EIR terminal 100 would allow such a company to deploy the same EIR terminal model in all the geographies.

In one embodiment, selection of the operating frequency of the RF front end can be performed manually by the user of the EIR terminal. In one embodiment, the selection can be performed by scanning a pre-defined bar code. In another embodiment, the selection can be performed by the user interacting with the user interface (e.g., via a graphical user interface (GUI), or via a hardware-implemented control). A skilled artisan would appreciate the fact that other methods of manually selecting a wireless communication network, a wireless communication protocol, or one or more parameters of the wireless communication protocol are within the scope of this disclosure.

In one embodiment, the antenna 390 of FIG. 2 can be made of a metamaterial (MTM). Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an MTM antenna can have a size of 33 mm.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, β), where E is the electrical field, H is the magnetic field, and β is the phase velocity) exhibiting a positive refractive index, a metamaterial due to its artificial structure can exhibit a negative refractive index and follow the left-hand rule for the trio (E, H, β). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

Figure 6A:
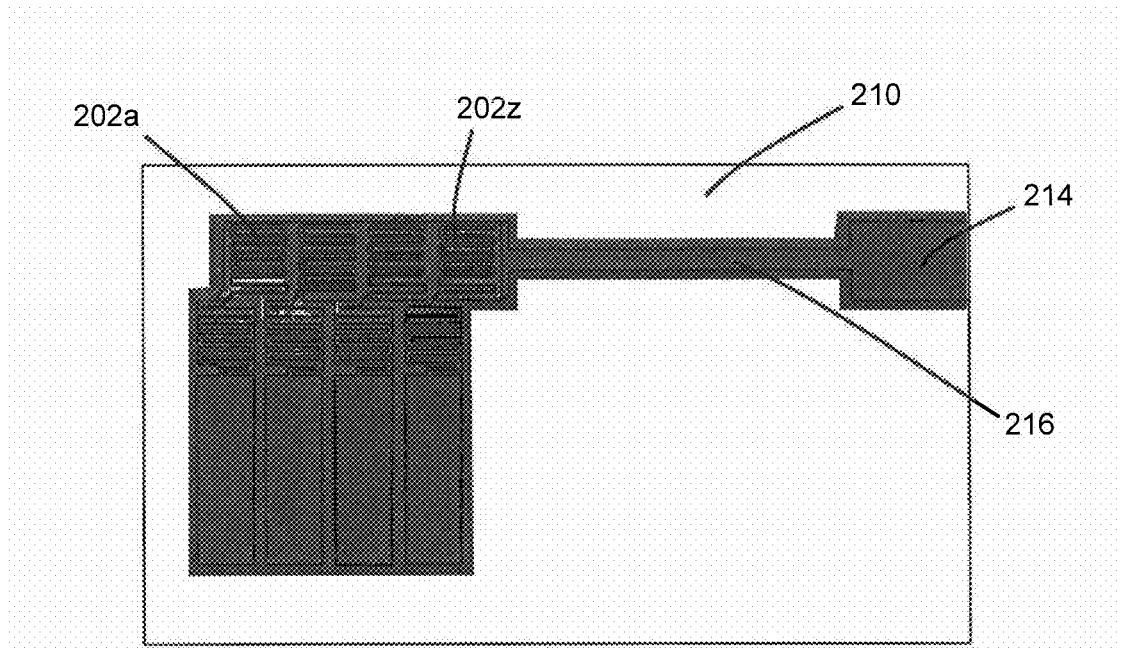
Figure 6B:
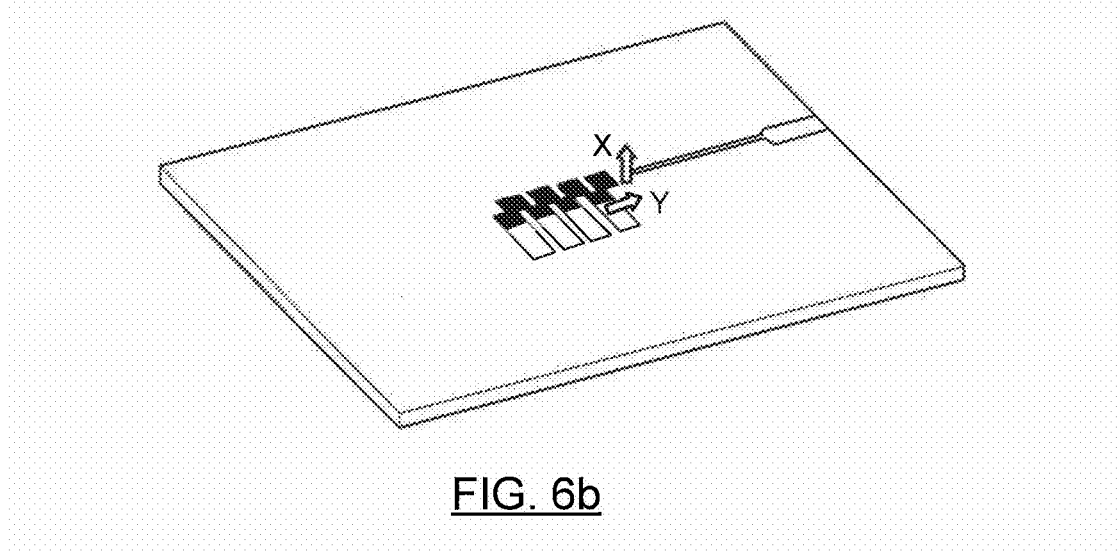

In one embodiment, antenna 390 of FIG. 2 can be provided by a multiple cell MTM antenna shown in FIGS. 6a (top view) and 6b (3D view). Antenna 390 can comprise one or more conductive cell patches 202a-202z that can be mounted on a dielectric substrate, provided, for example, by a printed circuit board (PCB) 210. Conductive cell patches 202a-202z can be spatially separated so that capacitive couplings between adjacent cell patches can be created. Also disposed on the dielectric substrate 210 can a feed pad 214 that can be provided, e.g., by a metallic plate and can be connected to a conductive feed line 216. Conductive feed line 216 can be provided, e.g., by metallic a strip. Conductive feed line 216 can be located close but separately from conductive cell patches 202a-202z. A skilled artisan would appreciate the fact that MTM antennas having two or more conductive feed lines are within the scope of this disclosure. A ground plane can be provided by a metallic layer disposed on the bottom side of PCB 210 (not shown in FIG. 4a). Each cell patch can be connected to the ground plane by a via.

In one embodiment, antenna 390 of FIG. 2 can be provided by a multiple cell MTM antenna shown in FIGS. 7a (top view), 7b (bottom view), and 7c (3D view). Antenna 390 can comprise one or more conductive cell patches 302a-302z that can be mounted on a dielectric substrate, provided, for example, by a printed circuit board (PCB) 310. Conductive cell patches 302a-302z can be spatially separated so that capacitive couplings between adjacent cell patches can be created. Also disposed on the top surface of dielectric substrate 310 can be a feed pad 314 that can be provided, e.g., by a metallic plate and can be connected to a conductive feed line 316. Conductive feed line 316 can be provided, e.g., by a metallic strip, and can be located close but separately from conductive cell patches 302a-302z. A skilled artisan would appreciate the fact that MTM antennas having one or more conductive feed lines are within the scope of this disclosure. At least one conductive feed line can comprise a feed line tuner 322 provided by a conductive strip having a curved line form or an open polygon line form. A feed line tuner can be used to adjust resonant frequency of antenna 390 as explained herein infra.

In one embodiment, feed pad 314 can be electrically coupled to coaxial cable connector 315. In one embodiment, shown in FIG. 7c, coaxial cable connector 315 can be connected from the bottom side of antenna 390. In another embodiment, coaxial cable connector 315 can be connected from a lateral side of antenna 390. In a yet another embodiment, feed pad 314 can be electrically coupled to a twisted cable.

Also disposed on the top surface of dielectric substrate 310 can be one or more ground planes 312a-312z provided, e.g., by one or more metallic plates.

One or more conductive cell patches 302a-302z can be connected by one or more vias 342a-342z to one or more conductive via lines 352a-352z disposed on the bottom surface of dielectric substrate 310. At least one conductive via line 352a-352z can comprise a via line tuner 354a-354z provided by a conductive strip having a curved line form or an open polygon line form. A via line tuner can be used to adjust resonant frequency of antenna 390 as explained herein infra. Also disposed on the bottom surface of dielectric substrate 310 can be a bottom ground plane 360.

Figure 8A:
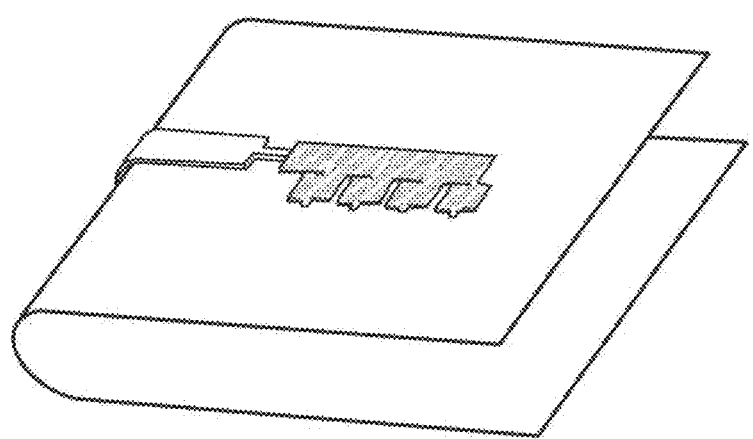
Figure 8B:

In one embodiment, dielectric substrate 310 can have a folded plane form-factor, as shown in FIGS. 8a (3D view) and 8b (side view). The gap between the two ends of the folded plane can be unfilled (air gap) or can be filled with a dielectric material. The folded design can advantageously offer extra air gap (or can be filled with other material). In another aspect, due to the folded design, a multi-layer MTM design can be implemented without inter-connections.

Figure 9B:
Figure 9A:
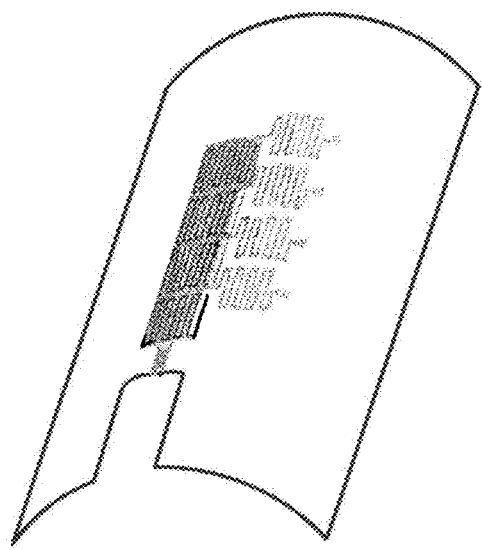

In one embodiment, dielectric substrate 310 can have a curved plane form-factor, as shown in FIGS. 9a (3D view) and 9b (side view). The gap between the two ends of the folded plane can be unfilled (air gap) or can be filled with a dielectric material. A skilled artisan would appreciate the fact that MTM antennas mounted on dielectric substrates having a more complex form factors (e.g., a 3D surface) are within the scope of this disclosure. A curved surface can advantageously provide additional tuning to the antenna directivity. A more complicated 3D surface can be constructed by folding and wrapping on object having a desired shape, such as a cone.

Figure 10A:
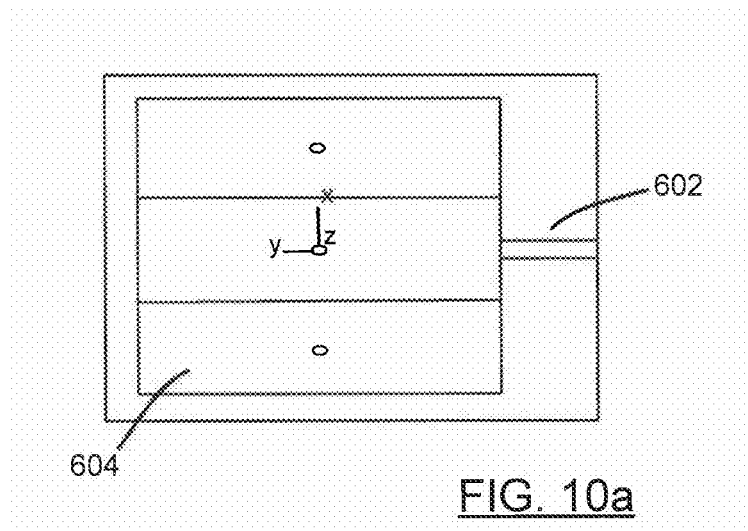
Figure 10B:
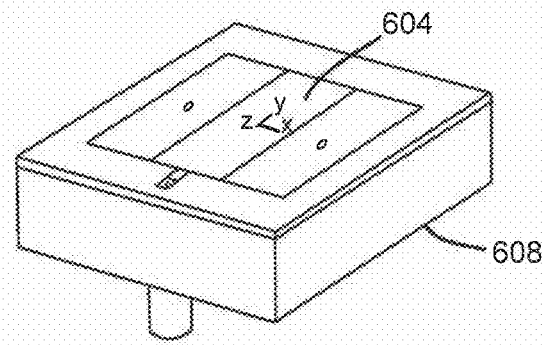

In one embodiment, antenna 390 of FIG. 2 can be provided by a mushroom-shape MTM antenna shown in FIGS. 10a (top view) and 10b (3D view). In one embodiment, the gap between the feed line 602 and the top patch 604 can form a capacitor (left-hand); the via between the top patch 604 and the bottom ground 608 can form an inductance (left-hand).

In one embodiment, the dielectric substrate can be integrated with and/or into the housing of the EIR terminal 100.

In a further aspect, antenna 390 of FIG. 2 can be broadband, ultrawideband (UWB), or multiband (MB). Antenna 390 of FIG. 2 can be designed to support the desired functionality and characteristics. Antenna size, resonant frequencies, bandwidth, and matching properties can be controlled by changing the antenna design parameters including number and size of cells, the gap between the cells, the gap between the feed line and the cells, the size (radius and height) and location of vias, the length and width of the feed line, the length and width of the via line, the material and thickness of the substrate, and various other dimensions and layouts.

Antenna size and resonant frequency can be controlled by the patch shape and size. Cell patches can have a rectangular, triangular, circular or other shape. The most efficient antenna area usage can be provided by a rectangular shape. In a further aspect, the resonant frequency can be sensitive to the via line length. To control the via line length, a via line tuner can be provided having a straight line form, a curved line form, or an open polygon line form. The via line length can be used to adjust resonant frequency due to its left hand inductive character. In a further aspect, the resonant frequency can be sensitive to the feed line length and the size of the gap between a feed line and a cell patch. To control the feed line length, a feed line tuner can be provided having a straight line form, a curved line form, or an open polygon line form. The feed line length can be used to adjust resonant frequency due to its left hand capacitive character. In a further aspect, the resonant frequency can be sensitive to the thickness of the substrate on which the antenna components are disposed. The substrate thickness can range from 0.1 mm to 150 mm depending upon the substrate material. Various materials having different permittivity can be used, for example, but not limited to, FR4 ($\in_r$=4.4), Getek ($\in_r$=4.0), Polyimide ($\in_r$=3.5), Polyester ($\in_r$=3.9), Arlon AD250 ($\in_r$=2.5), RT/duroid 5880 ($\in_r$=2.2), etc.

In another aspect, an antenna can comprise a single cell or multiple cells. A multi-cell antenna can have a smaller resonant frequency shift as compared to a single cell antenna, but also can have a higher peak gain due to a better beam concentration.

In another aspect, the antenna return loss can be controlled by the radius of one or more vias that connect the cell patches and the ground plane: vias having smaller radius can provide a better return loss.

Form factors and housings for the EIR terminal according to the invention are now being described. The components of EIR terminal 100 can be incorporated into a variety of different housings. As indicated by the embodiment of FIGS. 11a and 11b, the components of FIG. 2 can be incorporated into a hand held housing 101. EIR terminal 100 of FIGS. 11a and 11b is in the form factor of a hand held portable data terminal. EIR terminal 100 as shown in FIGS. 11a and 11b includes a keyboard 1090, a display 504 having an associated touch screen overlay, a card reader 1348, and an imaging module 360 which includes the components of imaging assembly as described herein; namely, image sensor array incorporated on an image sensor IC chip. Imaging module 360 has an associated imaging axis, $a_i$. As indicated by the side view of FIG. 11b, the components of the block diagram of FIG. 2 may be supported within housing 101 on a plurality of circuit boards 1077. Imaging module 360 may include an image sensor array having color sensitive pixels as described in Provisional Patent Application No. 60/687,606, filed Jun. 3, 2005, 60/690,268, filed Jun. 14, 2005, 60/692,890, filed Jun. 22, 2005, and 60/694,371, filed Jun. 27, 2005, all of which are entitled Digital Picture Taking Optical Reader Having Hybrid Monochrome And Color Image Sensor, and all of which are incorporated herein by reference.

Figure 12A:
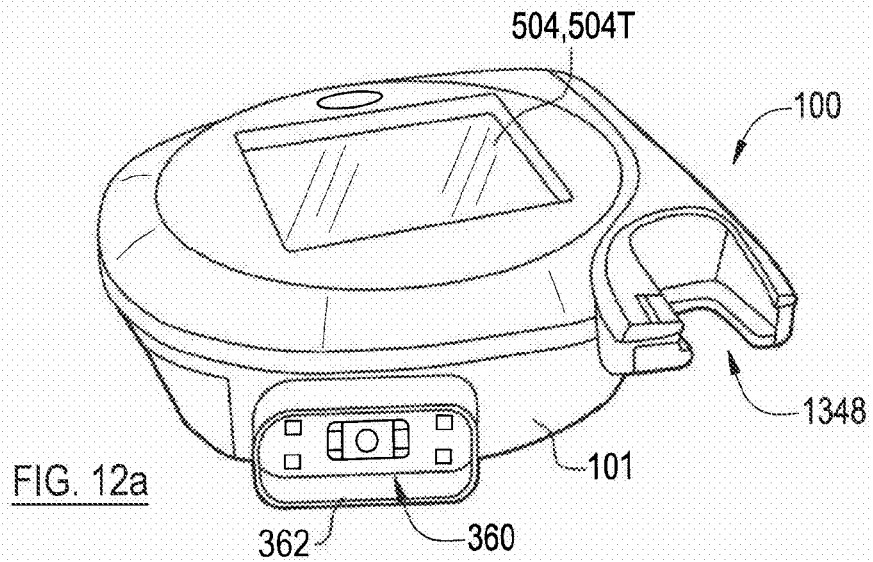
FIGS. 12a-12c illustrate an exemplary portable and remountable EIR terminal housing.
Figure 12B:
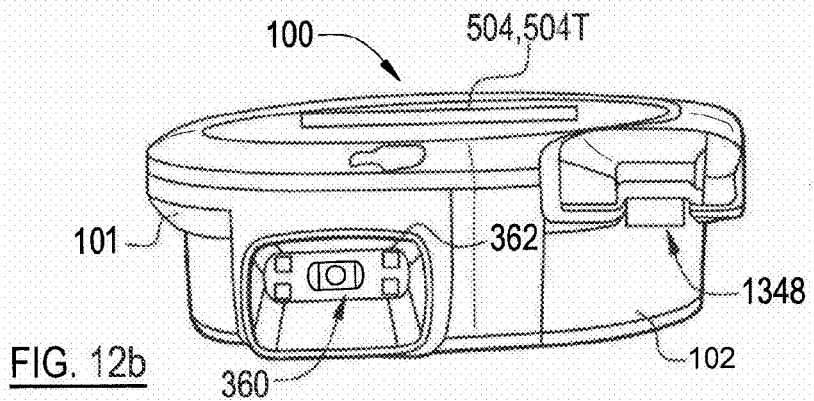
Figure 12C:
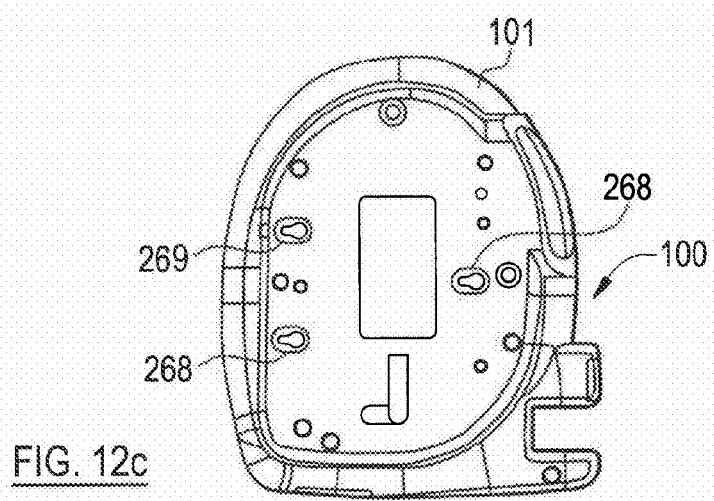

In the embodiment of FIGS. 12a-12c, the EIR terminal 100 is in the form of a transaction terminal which may be configured as a retail purchase transaction terminal or as a price verifier. Housing 101 of the transaction terminal shown in FIGS. 12a-12c is configured to be portable so that it can be moved from location to location and is further configured to be replaceably mounted on a fixed structure such as a fixed structure of a cashier station or a fixed structure of the retail store floor (e.g., a shelf, a column 264 best viewed in FIG. 13b). Referring to bottom view of FIG. 12c, the housing 101 of the EIR terminal 100 has formations 269 facilitating the replaceable mounting of EIR terminal 100 on a fixed structure. Referring now to FIG. 12b, EIR terminal 100 includes a display 504 having an associated touch screen 504T, a card reader 1348, an imaging module 360, and a luminous shroud 362. When light from the illumination block (not shown in FIG. 13) strikes luminous shroud 362, the shroud glows to attract attention to the location of imaging assembly. In certain operating modes as indicated in FIG. 13c, the EIR terminal 100 in accordance with any of FIGS. 12a-12c, displays on display 504 a PIN entry screen prompting a customer to enter PIN information into touch screen 504T. In other operating modes, as indicated in FIG. 13d, the EIR terminal 100 displays on display 504 a signature prompt screen prompting a customer to enter signature information into the device with use of a stylus 506.

Figure 13A:
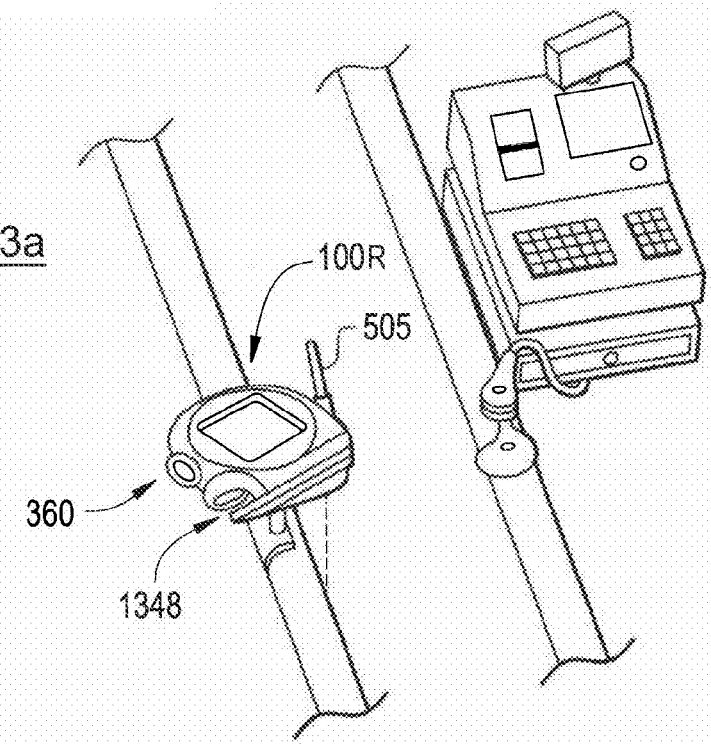
FIG. 13a illustrates a first exemplary deployment of EIR terminal 100 within a retail store.
Figure 13C:
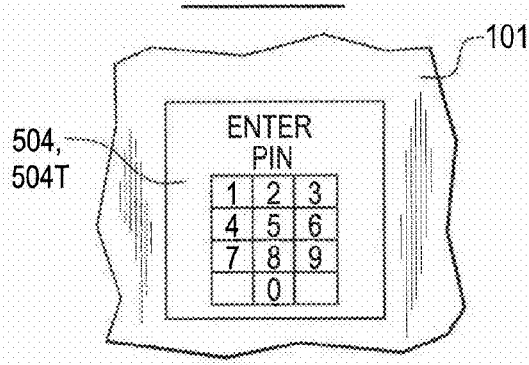
FIGS. 13c and 13d illustrate PIN and signature data entry operational modes of an EIR terminal.
Figure 13B:
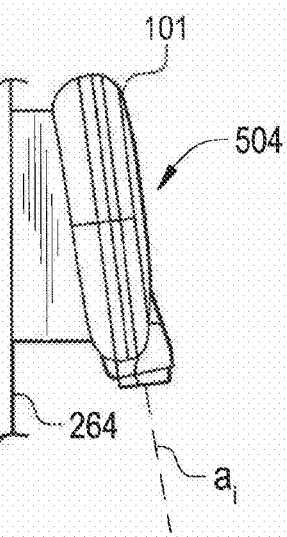
FIG. 13b illustrates a second exemplary deployment of an EIR terminal 100 within a retail store.
Figure 13D:
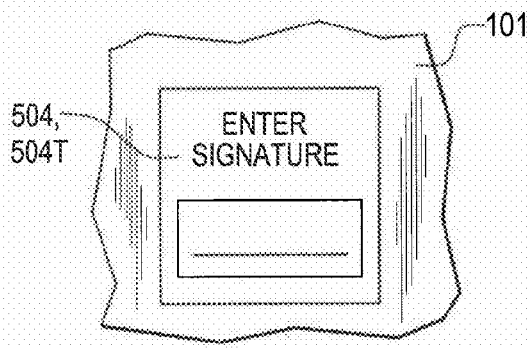

Referring to FIGS. 13a and 13b, various installation configurations for the EIR terminal of FIGS. 12a-12c are shown. In the view of FIG. 13a, the EIR terminal 100 is installed as a retail purchase transaction terminal at a point of sale cashier station. In the setup of FIG. 13a, the EIR terminal 100 is configured as a retail purchase transaction terminal and is utilized to aid and facilitate retail transactions at a point of sale. A customer may enter a credit card or a debit card into card reader 1348 and retail purchase transaction terminal may transmit the credit card information to credit/debit authorization network.

In the view of FIG. 13b, the EIR terminal 100 is configured as a price verifier to aid customers in checking prices of products located on a store floor. EIR terminal 100 may be mounted on a shelf (not shown in FIG. 13b) or on a column 254 or other fixed structure of the retail store. EIR terminal 100 may decode bar code data from bar codes on store products and transmit decoded out bar code messages to a store server for lookup of price information which is sent back from the store server to terminal 100 for display on display 504.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) terminal comprising:
   a microprocessor electrically coupled to a system/data bus;
   a memory communicatively coupled to said microprocessor;
   an EIR device selected from the group consisting of: a bar code reading device, an RFID reading device, and a card reading device, said EIR device configured to perform at least one of: outputting raw message data containing an encoded message and outputting decoded message data corresponding to an encoded message;
   a multi-band antenna; and
   a wireless communication interface comprising a radio frequency (RF) front end electrically coupled to said multi-band antenna;
   wherein said RF front end comprises a micro-electromechanical (MEMS) filter array, said filter array comprising one or more band-pass filter;
   wherein each band-pass filter of said MEMS filter array is electrically coupled to one of: a bias voltage source, an oscillating signal source;
   wherein said radio frequency front end is electrically coupled to at least one of: an analog-to-digital (A/D) converter electrically coupled to said system/data bus and a digital-to-analog (D/A) converter electrically coupled to said system/data bus; and
   wherein said wireless communication interface is configured to perform at least one of: transmitting radio signals in one or more frequency regulatory domains, receiving radio signals in one or more frequency regulatory domains.

A2. The EIR terminal of A1, wherein said RF front end further comprises a low noise amplifier and a micro-electromechanical (MEMS) down-conversion mixer-filter.

A3. The EIR terminal of A1, wherein said EIR terminal is configured to transmit at least one of: said raw message data, said decoded message data to an external host computer.

A4. The EIR terminal of A1, wherein said one or more frequency regulatory domains include one or more of: 800 MHz, 850 MHz, 900 MHz, 1700 MHz, 1800 MHz, 1900 MHz, 2100 MHz, 2400 MHZ, and 5 GHz.

A5. The EIR terminal of A1, wherein said wireless communication interface is configured to support at least one of: IEEE 802.11, IEEE 802.15, IEEE 802.16, GSM, GPRS, TDMA, EDGE, HSPA, CDMA, 1xEV-DO, UMTS, and LTE wireless communication protocols.

A6. The EIR terminal of A1, wherein said multi-band antenna is provided by a metameterial (MTM) antenna.

A7. The EIR terminal of A1, wherein said multi-band antenna is configured to support two or more frequency bands.

A8. The EIR terminal of A1, wherein each band-pass filter of said MEMS filter array is electrically coupled to a switch, said switch being electrically coupled to one of: said bias voltage source, said oscillating signal source.

A9. The EIR terminal of A8, wherein said microprocessor is configured to execute an operating frequency selector software program, said operating frequency selector software program configured to dynamically control said switch.

A10. The EIR terminal of A9, wherein said operating frequency selector software program is configured to dynamically control said switch based on estimated cost of data transmission.

A11. The EIR terminal of A9, wherein said operating frequency selector software program is configured to dynamically control said switch based on an amount of data to be transmitted.

A12. The EIR terminal of A9, wherein said operating frequency selector software program is configured to dynamically control said switch based on an estimated rate of data transmission.

A13. The EIR terminal of A9, wherein said operating frequency selector software program is configured to dynamically control said switch based on an estimated quality of a data transmission channel.

We claim:

1. An encoded information reading (EIR) terminal comprising:
   a microprocessor electrically coupled to a system/data bus;
   a memory communicatively coupled to said microprocessor;
   an EIR device selected from the group consisting of: a bar code reading device, an RFID reading device, and a card reading device, said EIR device configured to perform at least one of: outputting raw message data containing an encoded message and outputting decoded message data corresponding to an encoded message;
   a multi-band antenna; and
   a wireless communication interface comprising a radio frequency (RF) front end electrically coupled to said multi-band antenna;
   wherein said RF front end comprises a micro-electromechanical (MEMS) filter array, said filter array comprising one or more band-pass filter;
   wherein each band-pass filter of said MEMS filter array is electrically coupled to one of: a bias voltage source, an oscillating signal source;
   wherein said radio frequency front end is electrically coupled to at least one of: an analog-to-digital (A/D) converter electrically coupled to said system/data bus and a digital-to-analog (D/A) converter electrically coupled to said system/data bus;
   wherein said wireless communication interface is configured to perform at least one of: transmitting radio signals in one or more frequency regulatory domains, receiving radio signals in one or more frequency regulatory domains;
   wherein each band-pass filter of said MEMS filter array is electrically coupled to a switch, said switch being electrically coupled to one of: said bias voltage source, said oscillating signal source;

wherein said microprocessor is configured to execute an operating frequency selector software program, said operating frequency selector software program configured to dynamically control said switch; and wherein said operating frequency selector software program is configured to dynamically control said switch based on estimated cost of data transmission.

2. The EIR terminal of claim 1, wherein said RF front end further comprises a low noise amplifier and a micro-electromechanical (MEMS) down-conversion mixer-filter.

3. The EIR terminal of claim 1, wherein said EIR terminal is configured to transmit at least one of: said raw message data, said decoded message data to an external host computer.

4. The EIR terminal of claim 1, wherein said one or more frequency regulatory domains include one or more of: 800 MHz, 850 MHz, 900 MHz, 1700 MHz, 1800 MHz, 1900 MHz, 2100 MHz, 2400 MHZ, and 5 GHz.

5. The EIR terminal of claim 1, wherein said wireless communication interface is configured to support at least one of: IEEE 802.11, IEEE 802.15, IEEE 802.16, GSM, GPRS, TDMA, EDGE, HSPA, CDMA, 1xEV-DO, UMTS, and LTE wireless communication protocols.

6. The EIR terminal of claim 1, wherein said multi-band antenna is provided by a metameterial (MTM) antenna.

7. The EIR terminal of claim 1, wherein said multi-band antenna is configured to support two or more frequency bands.

8. The EIR terminal of claim 1, wherein said operating frequency selector software program is configured to dynamically control said switch based on an amount of data to be transmitted.

9. The EIR terminal of claim 1, wherein said operating frequency selector software program is configured to dynamically control said switch based on an estimated rate of data transmission.

10. The EIR terminal of claim 1, wherein said operating frequency selector software program is configured to dynamically control said switch based on an estimated quality of a data transmission channel.

11. An encoded information reading (EIR) terminal comprising:
a multi-band, metameterial (MTM) antenna;
a system/data bus;
a wireless communication interface comprising a radio frequency (RF) front end electrically coupled to the multi-band, MTM antenna, wherein:
the RF front end comprises a micro-electromechanical (MEMS) filter array comprising a band-pass filter;
the band-pass filter is electrically coupled to a switch;
the switch is electrically coupled to either a bias voltage source or an oscillating signal source;
the RF front end is electrically coupled to an analog-to-digital (A/D) converter electrically coupled to the system/data bus and/or a digital-to-analog (D/A) converter electrically coupled to the system/data bus; and
the wireless communication interface is configured for transmitting radio signals in a frequency regulatory domain and/or receiving radio signals in a frequency regulatory domain;
a microprocessor electrically coupled to a system/data bus, the microprocessor being configured for executing an operating frequency selector software program;
a memory communicatively coupled to the microprocessor; and
an EIR device comprising a bar code reading device, an RFID reading device, and/or a card reading device, the EIR device being configured for outputting raw message data containing an encoded message and/or outputting decoded message data corresponding to an encoded message;
wherein the operating frequency selector software program is configured for dynamically controlling the switch based on estimated cost of data transmission.

12. The EIR terminal of claim 11, wherein the RF front end comprises a low noise amplifier and a micro-electromechanical (MEMS) down-conversion mixer-filter.

13. The EIR terminal of claim 11, wherein the EIR terminal is configured for transmitting raw message data and/or decoded message data to an external host computer.

14. The EIR terminal of claim 11, wherein the operating frequency selector software program is configured for dynamically controlling the switch based on an estimated rate of data transmission.

15. The EIR terminal of claim 11, wherein the operating frequency selector software program is configured for dynamically controlling the switch based on an estimated quality of a data transmission channel.

16. An encoded information reading (EIR) terminal comprising:
a multi-band antenna;
a system/data bus;
a wireless communication interface comprising a radio frequency (RF) front end electrically coupled to the multi-band antenna, wherein:
the RF front end comprises a micro-electromechanical (MEMS) filter array comprising a band-pass filter;
the band-pass filter is electrically coupled to a switch;
the switch is electrically coupled to either a bias voltage source or an oscillating signal source;
the RF front end is electrically coupled to an analog-to-digital (A/D) converter electrically coupled to the system/data bus and/or a digital-to-analog (D/A) converter electrically coupled to the system/data bus; and
the wireless communication interface is configured for transmitting radio signals in a frequency regulatory domain and/or receiving radio signals in a frequency regulatory domain;
a microprocessor electrically coupled to a system/data bus, the microprocessor being configured for executing an operating frequency selector software program;
a memory communicatively coupled to the microprocessor; and
an EIR device comprising a bar code reading device, an RFID reading device, and/or a card reading device, the EIR device being configured for outputting raw message data containing an encoded message and/or outputting decoded message data corresponding to an encoded message;
wherein the operating frequency selector software program is configured to dynamically control the switch based on an amount of data to be transmitted.

17. The EIR terminal of claim 16, wherein the EIR terminal is configured for transmitting raw message data and/or decoded message data to an external host computer.

18. The EIR terminal of claim 16, wherein the multi-band antenna is a metameterial (MTM) antenna.

19. The EIR terminal of claim 16, wherein the operating frequency selector software program is configured for dynamically controlling the switch based on an estimated rate of data transmission.

20. The EIR terminal of claim 16, wherein the operating frequency selector software program is configured for dynamically controlling the switch based on an estimated quality of a data transmission channel.

* * * * *